(12) United States Patent
Dawkins et al.

(10) Patent No.: US 10,043,036 B1
(45) Date of Patent: Aug. 7, 2018

(54) SYSTEMS AND METHODS FOR TOKENIZATION TO SUPPORT PSEUDONONYMIZATION OF SENSITIVE DATA

(71) Applicants: Jerald Dawkins, Tulsa, OK (US); Michael Ray Oglesby, Broken Arrow, OK (US); Justin Stanley, Bixby, OK (US)

(72) Inventors: Jerald Dawkins, Tulsa, OK (US); Michael Ray Oglesby, Broken Arrow, OK (US); Justin Stanley, Bixby, OK (US)

(73) Assignee: TokenEx, LLC, Edmond, OK (US)

( * ) Notice: Subject to any disclaimer, the term of this patent is extended or adjusted under 35 U.S.C. 154(b) by 0 days.

(21) Appl. No.: 15/683,173

(22) Filed: Aug. 22, 2017

(51) Int. Cl.
| | |
|---|---|
| H04L 29/06 | (2006.01) |
| G06F 21/00 | (2013.01) |
| G06F 21/62 | (2013.01) |
| H04L 9/06 | (2006.01) |
| G09C 1/00 | (2006.01) |
| G06F 7/58 | (2006.01) |

(52) U.S. Cl.
CPC .......... *G06F 21/6254* (2013.01); *G09C 1/00* (2013.01); *H04L 9/0618* (2013.01); *G06F 7/588* (2013.01); *H04L 2209/08* (2013.01)

(58) Field of Classification Search
CPC ... G06F 21/6254; G06F 7/588; H04L 9/0618; H04L 2209/08; G09C 1/00
See application file for complete search history.

(56) References Cited

U.S. PATENT DOCUMENTS

| | | | | | |
|---|---|---|---|---|---|
| 4,591,704 | A | * | 5/1986 | Sherwood | G06Q 20/3672 235/380 |
| 7,873,569 | B1 | * | 1/2011 | Cahn | G06Q 40/00 705/35 |
| 8,775,810 | B1 | * | 7/2014 | Snodgrass | H04L 9/08 713/175 |
| 2007/0071068 | A1 | * | 3/2007 | Lablans | H04B 1/7143 375/132 |
| 2008/0104399 | A1 | * | 5/2008 | Fascenda | H04L 9/3271 713/168 |
| 2010/0268966 | A1 | * | 10/2010 | Leggette | G06F 21/6227 713/193 |
| 2012/0102548 | A1 | * | 4/2012 | Tamura | H04L 63/0884 726/4 |
| 2014/0379823 | A1 | * | 12/2014 | Wilsher | H04L 12/287 709/206 |
| 2015/0067881 | A1 | * | 3/2015 | Badstieber | G06F 21/6254 726/26 |

(Continued)

*Primary Examiner* — Lisa C Lewis
(74) *Attorney, Agent, or Firm* — John M. Behles

(57) ABSTRACT

Systems and methods for tokenization to support pseudonymization are provided herein. An example method includes receiving an input set, seeding a random number generator with one or more secret data, transposing the input set using a first random number/transposition parameter generated by the random number generator to create a transposed input set, transposing a token set using a second random number/transposition parameter generated by the random number generator to create a transposed token set, and generating a token by substituting transposed input set values with transposed token set values.

12 Claims, 5 Drawing Sheets

(56) References Cited

U.S. PATENT DOCUMENTS

| | | | |
|---|---|---|---|
| 2016/0085721 A1* | 3/2016 | Abali | G06F 9/3001 |
| | | | 712/15 |
| 2016/0142409 A1* | 5/2016 | Frei | H04L 63/0884 |
| | | | 713/176 |
| 2017/0118215 A1* | 4/2017 | Varadarajan | G06F 17/30949 |
| 2017/0134587 A1* | 5/2017 | Lawson | H04M 7/0075 |
| 2017/0147829 A1* | 5/2017 | Cismas | G06F 21/6218 |

\* cited by examiner

SYSTEMS AND METHODS FOR TOKENIZATION TO SUPPORT PSEUDONONYMIZATION OF SENSITIVE DATA

CROSS REFERENCE TO RELATED APPLICATIONS

N/A

FIELD OF THE PRESENT DISCLOSURE

The present disclosure relates generally to tokenization to support pseudonymization, and more particularly but not by limitation, to systems and methods that allow data, and in some instances, sensitive data such as social security numbers, to be tokenized and used for purposes such as pseudonymization. Some embodiments include pseudonymization using tokenization of the present disclosure.

SUMMARY

Various embodiments of the present disclosure are directed to a polyalphabetic ciphering method for tokenizing data, comprising: (a) receiving an input set; (b) seeding a random number generator with one or more secret data; (c) transposing the input set using a first random number generated by the random number generator to create a transposed input set; (d) transposing a token set using a second random number generated by the random number generator to create a transposed token set; and (e) generating a token by substituting transposed input set values with transposed token set values.

Various embodiments of the present disclosure are directed to a polyalphabetic ciphering method for tokenizing data, comprising: (a) receiving an input set; (b) transposing the input set using a transposition parameter generated from a seed parameter, the transposition parameter being used to create a transposed input set; (c) transposing an extended token set using a second random number to create an extended, transposed token set; (d) generating a token by substituting transposed input set values with transposed token set values; (e) repeating the prior steps a plurality of rounds to generate a final token, wherein in each round the input set is replaced with a newly generated token from a prior round; and (f) wherein during generation of the final token, encoding a validation value into the final token that is used to validate the token during a detokenizing process.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DESCRIPTION OF EXEMPLARY EMBODIMENTS

For context, the present disclosure is directed to systems and methods that allow for tokenization of data and pseudonymization. In some embodiments, the data can include sensitive data such as credit card numbers, social security numbers, account numbers, and so forth. The present disclosure is not so limited and can be utilized to tokenize and/or pseudonymize any data. Tokenization relates to processes where data (sensitive or otherwise) is converted into another form that is unusable to anyone who does not possess the ability to recover the data from its converted form. An example would include the string "Afnd3945dag4gT5" being used to represent the credit card number "1111-123-123-11221". The replacement of the credit card in a transaction request with the string would be an example of pseudonymization. In general, pseudonymization is the process of replacing data in a document or other medium with a tokenized form of the data. In order to recover the original data that is represented by the token, one must possess a mapping of the token with the original data.

While methods for tokenization have been disclosed, the present disclosure also provides a unique solution of allowing for tokenization and pseudonymization without maintaining a vault or repository of tokens and mappings to the original data. These solutions are referred to as stateless and/or vaultless tokenization. As no entity is required to store the token and data pairs, the present disclosure further reduces the need for an entity providing the tokenization and pseudonymization services to comply with data privacy requirements. For example, if the data includes credit card information, practicing the present disclosure would reduce or minimize an entity's compliance requirements with payment card industry (PCI) regulations, which place onerous burdens on those who possess, store, and use credit card information.

Generally, the present disclosure is directed to systems and methods that receive an input and then convert the input (or a portion thereof) into a token using iterative steps of transposing of the input followed by replacing of the shuffled input with data from a shuffled token set to create the token.

In some embodiments, methods can include a process of encoding a checksum or additional random seed material into the token. For example, the checksum can comprise a binary set of values that was used to obtain the shuffled output.

These and other advantages of the present disclosure are disclosed herein with reference to the collective drawings.

Figure 1:
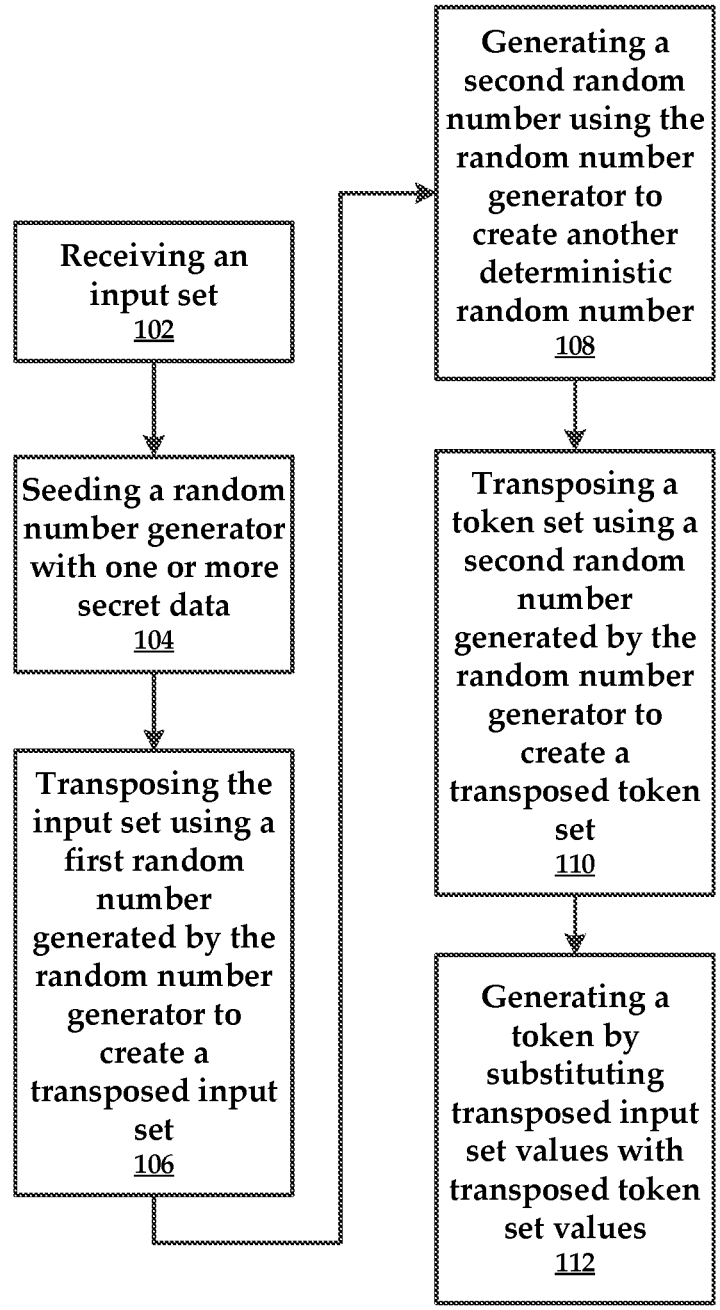
FIG. 1 is a flow diagram of an example method for tokenizing data in accordance with the present disclosure, as well as optionally pseudonymizing an object with the token.

FIG. 1 is a flowchart of an example polyalphabetic ciphering method for tokenizing data. The method comprises a step 102 of receiving an input set. For example, the input set comprises data that can include sensitive data such as a credit card number, a bank account number, a name, a social security number, an address, or any other data that includes personally identifiable information and/or personal health information.

The input set can comprise any plain text string of characters including letters, numbers, symbols, and the like. An example process for receiving the input could include a credit card swipe into a credit card processing machine or the typing of information into an interface.

For purposes of clarity and brevity of disclosure, the instant example will describe a process for tokenizing a portion of a credit card number. In this instance, it is desired to tokenize the first four digits [1, 2, 3, 4] of a credit card number. In relation to other portions of the method, it will be understood that each digit of the portion of the credit card occupies a position in the input string. For example, the "1" digit occupies a zero position of the input string, "2" is in the one position, "3" is in the two position, and "4" is in the three position.

In various embodiments, the method can optionally include a step of encrypting the input set to provide an additional aspect of security. Example encryption algorithms include AES encryption, although other encryption methods that would be known to one of ordinary skill in the art are likewise contemplated for use in accordance with the present disclosure. This step creates a layer of complexity in the tokenization process, where instead of using the sensitive information in the process, the sensitive information is first encrypted.

In some embodiments, the method comprises a step 104 of seeding a random number generator with one or more secret data (e.g., seed parameter(s)). The one or more secret data can include a unique identifier for an entity. To be sure, the secret data can include both sensitive data that is indicative of the entity and/or non-sensitive data that is not indicative of the entity. For example, if an entity desires to tokenize their data, a unique number is assigned to the entity. This secret information is used to seed a random number generator. The secret information can also be included as a part of the sensitive data itself. For example, a numeric customer number can be appended to the sensitive information, such as a social security number. Thus, the secret information can serve both to seed the random number generator, as well as add complexity and added security to the sensitive information.

The output of the random number generator is a value referred to herein as a transposition parameter. The transposition parameters/random numbers are used to transpose or shuffle values of the input set. Many random numbers can be generated to transpose not only the input set one or more times, but also to transpose a token set and/or extended token set, as will be described in greater detail herein.

The values generated by the random number generator can include pseudo random numbers that are generated with a deterministic random number generator. Again, the random number generator is seeded with the seed parameter which comprises a unique identifier that is created for each user. That is, each user is associated with a unique number and this unique number is used to generate the random numbers used in the method to shuffle various data sets, as disclosed in greater detail below.

The resultant output of the random number generator that is seeded with the secret data is referred to as a transposition parameter. The transposition parameter is effectively a first random number, which is deterministically generated.

In this example, it can be assumed that the transposition parameter is "2." Using the transposition parameter, the method includes replacing a first digit in the input string with a value of the input string in the second position. Thus, the input set is transposed from [1, 2, 3, 4] to [3, 1, 2, 4], in this example.

Thus, the method includes a step 106 of transposing the input set using a first random number generated by the random number generator to create a transposed input set. It will be understood that the first random number is the transposition parameter.

In some embodiments, the method includes a step 108 of generating a second random number using the random number generator to create another deterministic random number. This second random number is used to transpose a token set, which comprises values that will be used to replace input set values to create a token.

In one or more embodiments, the method includes a step 110 of transposing a token set using a second random number generated by the random number generator to create a transposed token set. This value is used to transpose or shuffle values inside the token set.

For example, the original token set could include {A, B, C, D}. The token set can include, for example, upper case letters, lower case letters, symbols, emoji, or any combinations or permutations thereof.

The transposed token set could include, for example, {C, B, A, D}, based on the application of a second random number.

Once the transposed input set is generated and the transposed token set is generated as specified infra, the method can comprise a process of substitution in order to generate a token. In some embodiments, the method includes a step 112 of generating a token by substituting transposed input set values with transposed token set values.

By way of example, using the transposed input set [3, 1, 2, 4] and the transposed token set {C, B, A, D}, a substitution is performed. The transposed token set {C, B, A, D} is substituted and becomes the token that replaces the transposed input set [3, 1, 2, 4].

The method steps 102-112 can be performed in any number of rounds desired. Each round will increase the complexity and security of the method, thereby reducing a likelihood that the input set can be recovered. Thus, the process iteratively generates new token(s) based on a previously generated token. That is, the last previously generated token becomes the new input set that is subsequently processed to create another token through the aforementioned transposition and substitution methods.

Figure 2:
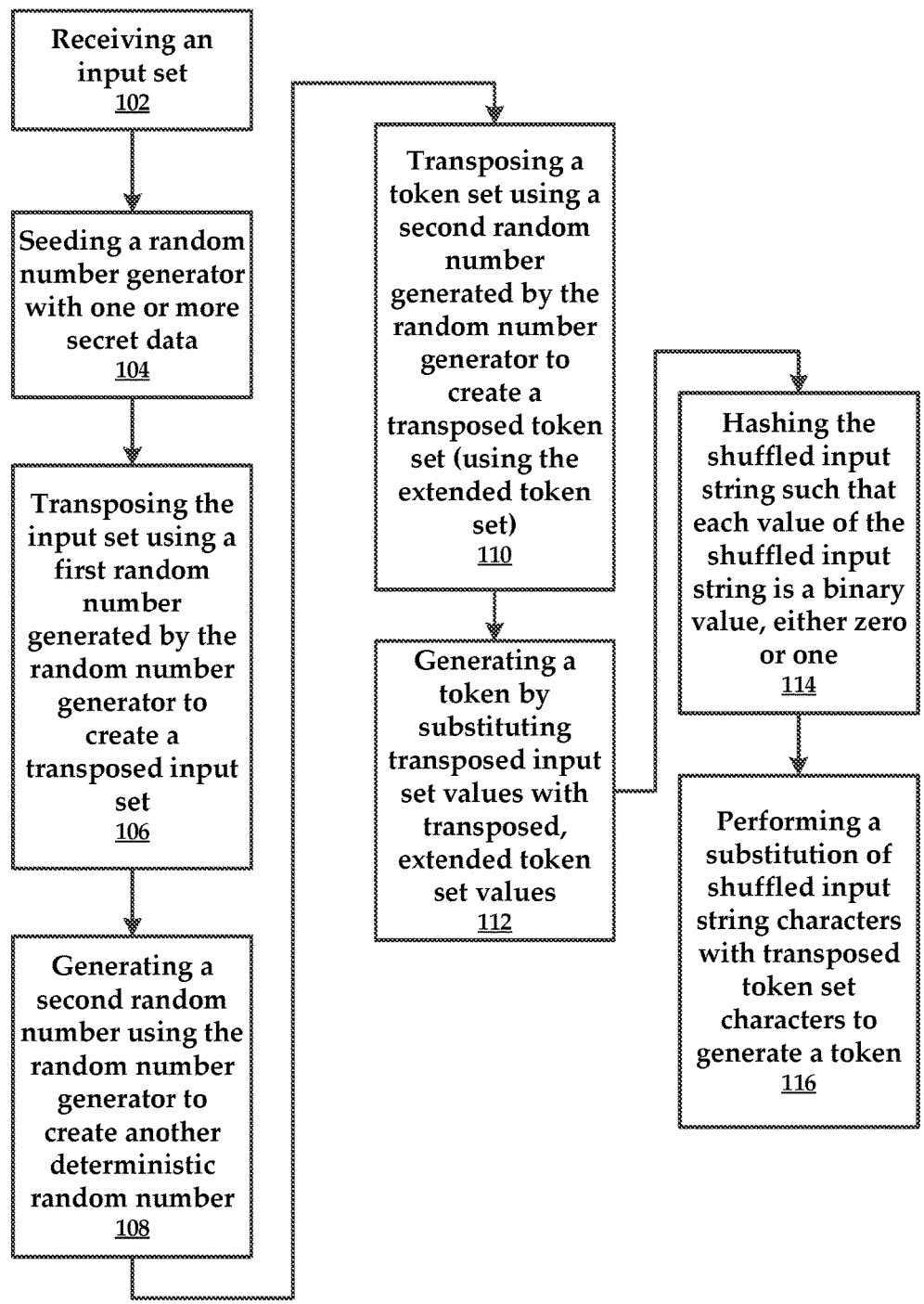
FIG. 2 is a flow diagram of another example tokenization and/or pseudonymizing method of the present disclosure that allows for the use of an extended token set and token validation.

FIG. 2 is a flowchart that includes all of the steps 102-112 of FIG. 1, but also includes a sub-method for encoding a token validation value into the token. The method can include generating and using an extended token set in place of the original, shorter length token set.

For example, the original token set included {A, B, C, D}, in the example above. An extended token set could include {A, B, C, D; E, F, G, H}. It will be understood that a size of the token set is double a size of the input set values, in some embodiments. Thus, since the input set was four characters [1, 2, 3, 4], the token set is eight characters in size. The extended token set can include, for example, upper case letters, lower case letters, symbols, emoji, or any combinations or permutations thereof.

In the method described above, when the token set is transposed, the token set would include transposing the extended token set, rather than just the original, shorter length token set.

The transposed, extended token set could include, for example, {E, H, D, C, G, A, B, F}, based on the use of a second random number generated by the random number generator.

Next, the method includes a step 114 of hashing the shuffled input string such that each value of the shuffled input string is a binary value, either zero or one. In this example, the hash value of {3, 2, 1, 4} is {1, 0, 0, 1}. Hashing the shuffled input string creates a binary set that can be used as a check sum value, referred to as a validation value, to verify or validate the token.

Thus, steps 110 and 112 are executed using an extended token set, as reflected in FIG. 2.

According to some embodiments, the method includes a step 116 of performing a substitution of shuffled input string characters with transposed token set characters to generate a token. This process includes the use of the binary set of the shuffled input string.

In the example herein, the first position of the shuffled input string is 3, and the binary is one. The number 3 is in the second index position in the original input string character space. Due to the fact that the binary is one, the length of the input string is added to the value. Thus, the swap value is seven (3 [shuffled input string value]+4 [length of input string]). Using the value of seven, the transposed token set value of "B" is selected. It will be understood that a token value position is a location in the shuffled token set that is used to replace a position in the transposed input set. For example the token value position seven is "B" and it is used to replace the first position in the transposed input set.

In another example, the second position in the shuffled input string is 1 and it is associated with a binary value of zero. Thus, using the transposed token set, the one is replaced with an "E" from the transposed token set.

The resultant token created from the substitution process would be 'BEHF', which itself encodes the binary set {1, 0, 0, 1}.

In sum, when a binary value associated with a shuffled input string digit is one, a length of the input string is added to the shuffled input string digit. When a binary value associated with a shuffled input string digit is zero, the shuffled input string digit is utilized alone.

The token can then be used to perform a transaction or used in a pseudonymizing process. For example, if the user's credit card were scanned and placed into a webform, rather than seeing the credit card number "1111-123-123-11221" the credit card number would be replaced with "BEHF-123-123-11221". Additional or fewer digits of the credit card number can be replaced using the aforementioned methods.

As mentioned above, the transposing steps disclosed herein are predicated upon the generation of random numbers to shuffle objects such as the token set. The random number is seeded with secret data (e.g., seed parameter). Because this seed parameter is used as the basis for generating random numbers, if the seed is known, a user can regenerate the same random numbers that allow for regeneration of the transposed token set(s), based on the number of rounds performed. This principle allows for recreation of the transposed token set(s) when recovering the input set and/or the token validation value (e.g., binary set) in a subsequent transaction.

Thus, to detokenize the token BEHF, the only information required is the original token set and the seed parameter that was used to generate the token. The deterministic nature of the random number generator, when seeded with the seed parameter (e.g., secret data) ensures that the token set is transposed correctly.

Figure 3:
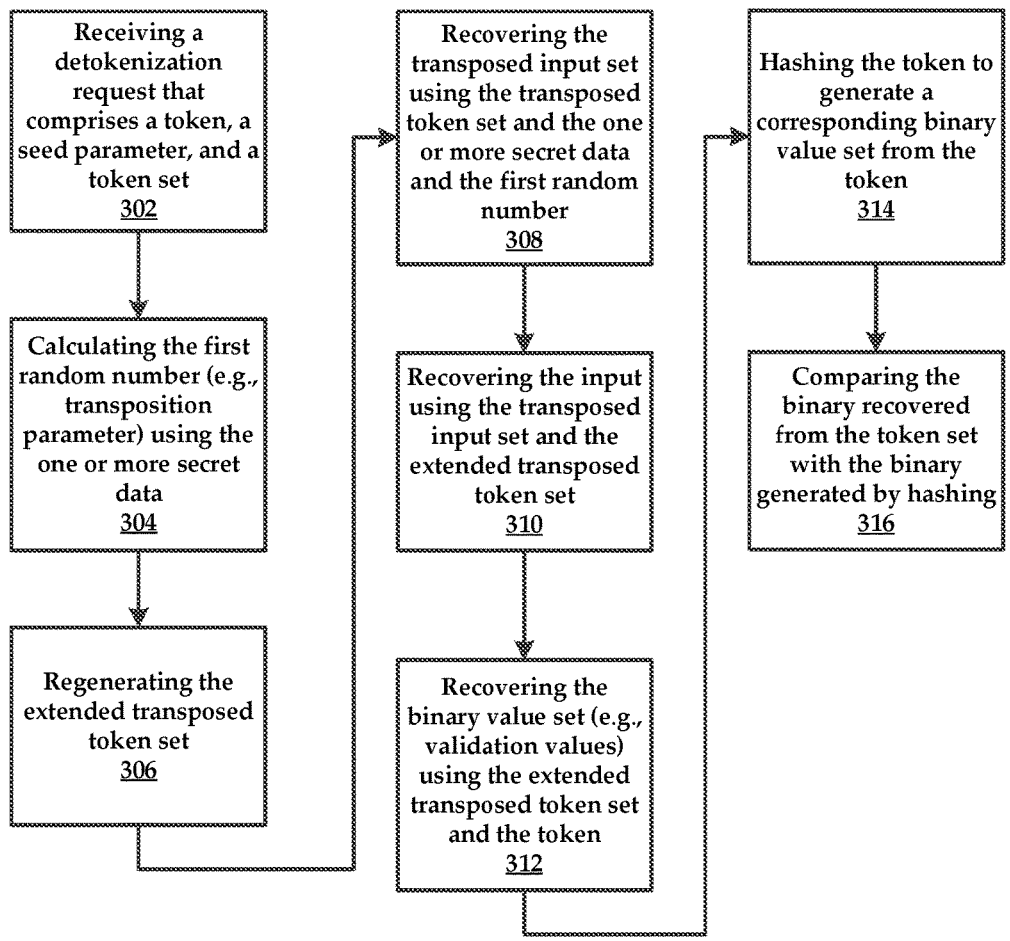
FIG. 3 is a flow diagram of another example detokenizing and validating method.

FIG. 3 illustrates an example method for recovering an input from a token in accordance with the present disclosure. The method includes a step 302 of receiving a detokenization request that comprises a token, a seed parameter (e.g., one or more secret data), and a token set. To be sure, the token included in the request is the same token generated using the seed parameter and the token set. Again, the seed parameter is the unique identifier that is used to generate random numbers used to shuffle the token set when generating the token.

Next, the method comprises a step 304 of calculating the first random number (e.g., transposition parameter) using the one or more secret data, as well as a step 306 of regenerating the extended transposed token set.

The method also comprises a step 308 of recovering the transposed input set using the transposed token set and the one or more secret data and the first random number.

The method also includes a step 310 of recovering the input using the transposed input set and the extended transposed token set.

According to some embodiments, a validation method is utilized to validate the token received. In some embodiments, once the extended transposed token set is regenerated, the method includes a step 312 of recovering the binary value set (e.g., validation values) using the extended transposed token set and the token. In order to validate the token, the method includes a step 314 of hashing the token to generate a corresponding binary value set from the token. The method includes a step 316 of comparing the binary recovered from the token set with the binary generated by hashing. It will be understood that if these values match, the token is validated.

Figure 4:
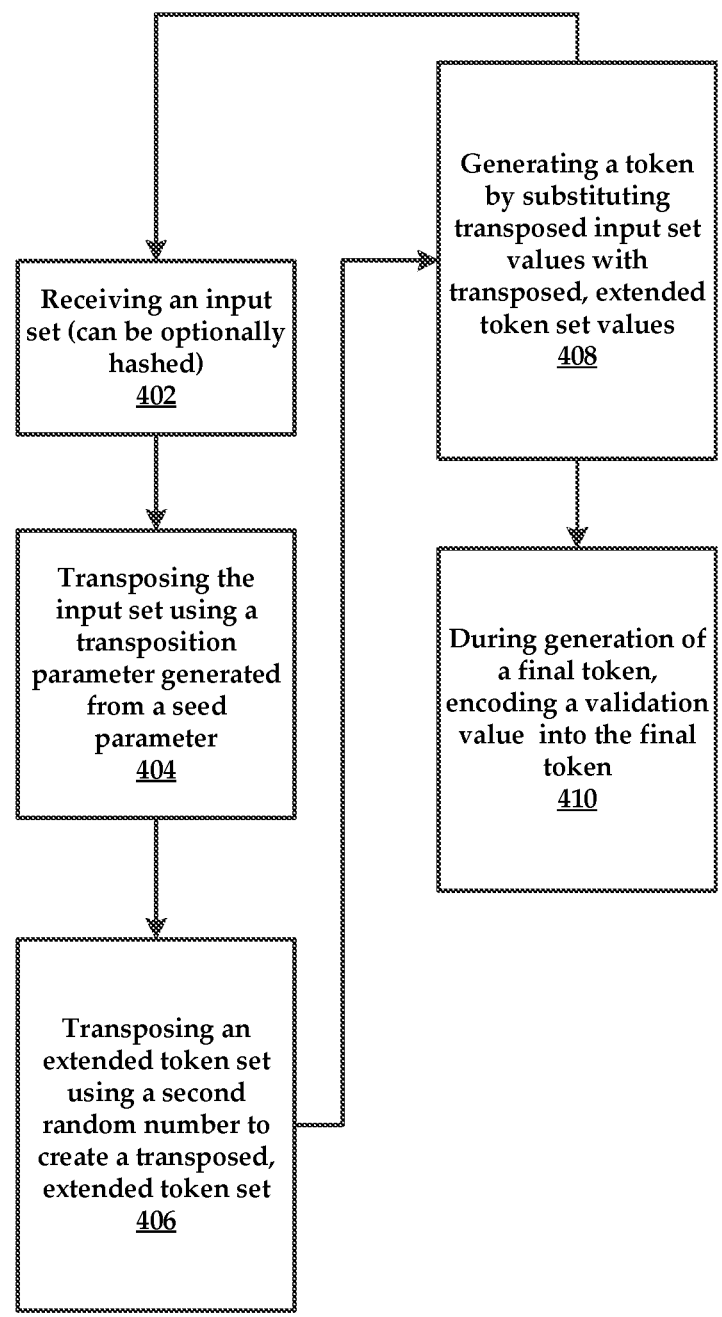
FIG. 4 is a flow diagram of an example method for tokenizing data in accordance with the present disclosure.

FIG. 4 is a flowchart of an example method of the present disclosure. The method comprises a step 402 of receiving an input set. As mentioned above, the encrypted input set is created when sensitive data is encrypted using, for example, AES encryption or another suitable encryption protocol.

This process can also include hashing the input set, in an optional embodiment.

Next, the method includes a step 404 of transposing the input set using a transposition parameter (e.g., random number) generated from secret information, such as a seed parameter, and or using the hash of the input. To be sure, the transposition parameter is used to create a transposed input set. The transposition parameter is a deterministically generated value that informs the transposition of the encrypted input set.

It will be understood that in some embodiments, a new transposition number/random number is generated for each character in the input set. In other embodiments, only a single transposition/shuffling of the input characters occurs.

Next, the method includes a step 406 of transposing an extended token set using a second transposition parameter to create a transposed, extended token set.

In one or more embodiments, the method includes a step 408 of generating a token by substituting transposed input set values with transposed, extended token set values.

The method includes repeating the prior steps 402-408 a plurality of rounds to generate a final token. It will be understood that in each round, the input set is replaced with a newly generated token from a prior round.

Also, in some embodiments, during generation of a final token, a validation value can be encoded into the final token in step 410. To be sure, when the next to last transposed input set is awaiting substitution with value from a transposed, extended token set, the next to last transposed input set is hashed to create a binary value set. In the examples above, the binary value set of {1, 0, 0, 1} is utilized.

During generation of the final token, the validation value {1, 0, 0, 1} is encoded into the final token that is used to validate the token during a detokenizing process. Substitution using a validation value is described supra and is utilized to generate the final token that is used to complete a transaction or used in a pseudonymization process.

As mentioned above, the method can also include steps related to detokenization of the token to recover the original input set. In some embodiments, the detokenization process can comprise a step of decoding the hash value from the token. Next, the method can comprise seeding a random number with the hash and one or more secrets (or non-secret data). These one or more secrets have been shared with the entity that is detokenizing.

In some embodiments, the transposed value is recovered, along with the transposed token space. The substituted value (e.g., encoded value) is recovered. This process is repeated for any number of rounds that were required to create the token, in order to obtain the input set. A hash is calculated on the input set and is validated when the hash matches decoded hash value.

This detokenization process can occur by an entity that has a pseudonymized document that comprises a token/final token created using the processes described herein. In some embodiments, the pseudonymized document includes a token in place of an input set. For example, an employment application comprises a token in place of a social security number (e.g., input set). Again, not all the social security number can be tokenized in some embodiments. When the employment application is received by the employer, the employment application has been pseudonymized to ensure that the sensitive information of the social security number has been replaced with a token generated in accordance with at least one of the methods described herein. The employer can request detokenization of the token in the employment document. The employer can receive the content utilized to seed a random number generator when creating the token. This includes the one or more secret or non-secret information, such as a unique identifier and/or a hash of the input set. The entity can then detokenize the token to recover the input set as has been described in greater detail above. Thus, the entity now possesses the employment application and can utilize the social security number (or portion thereof) recovered from the token.

In some embodiments, the token can be embodied as a quick response (QR) code, a barcode, or any other type of readable object. The readable object can be printed on a substrate such as a ticket. The readable object could be used for example, to verify an identity of an individual in possession of a ticket. That is, information that is indicative of an individual can be tokenized and printed on a ticket or other virtual versions thereof. An entity desiring to verify an identity of the possessor of the ticket can utilize a device that is programmed to effectuate the polyalphabetic ciphering and detokenization methods of the present disclosure. This device need not be connected to a network in order to detokenize the token in the ticket. The device is programmed with the secret or non-secret information for an entity that should be in possession of a ticket. Using the secret or non-secret information and the token, the device can detokenize the token and recover the input set. This input set, such as a name, address, social security number, driver license number that was used as the input set, and so forth, can be verified against an identification document possessed by the individual to verify that the one who possesses the ticket, and the one for whom the token was generated for placement on the ticket, are one in the same.

Figure 5:
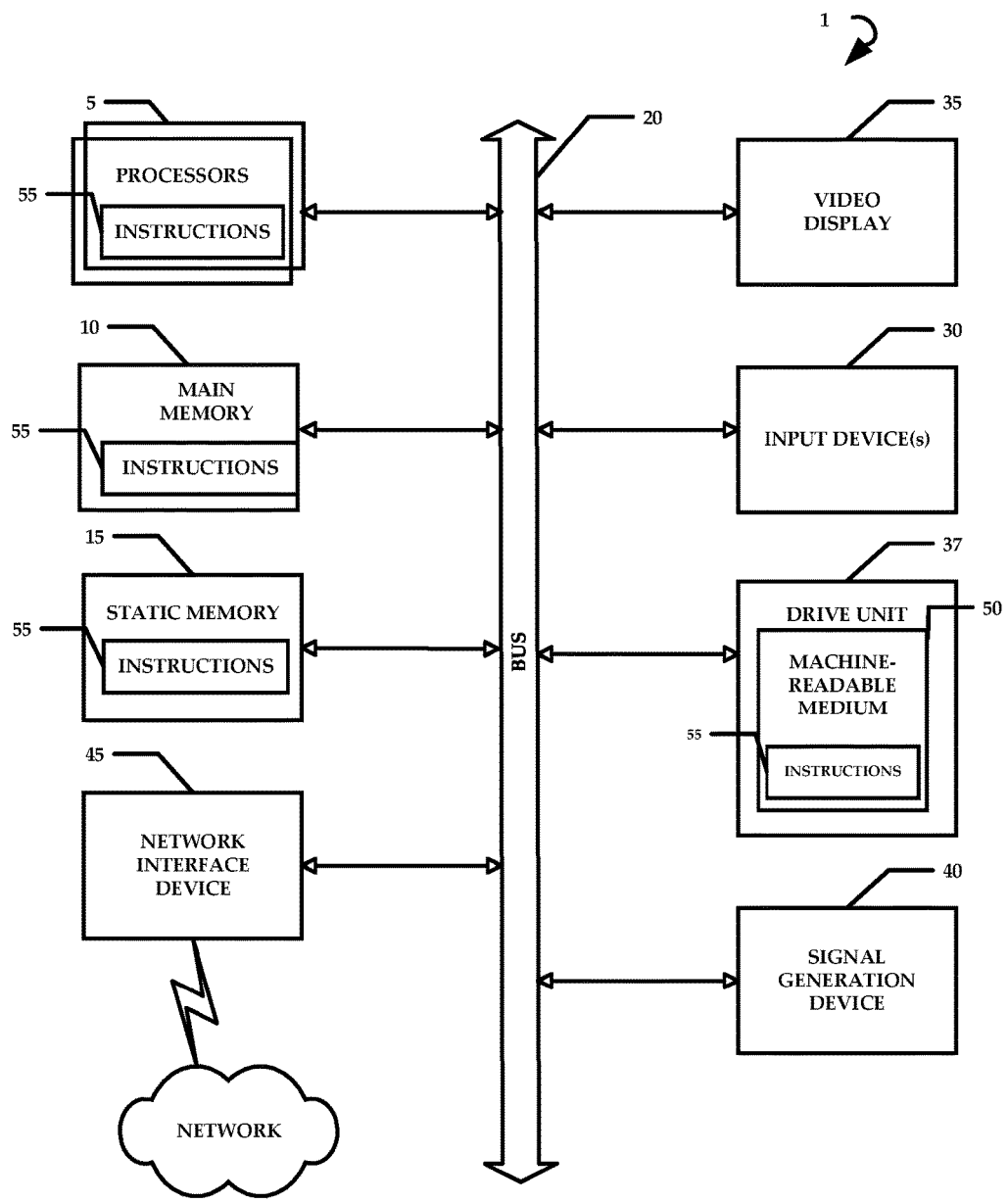
FIG. 5 is a schematic diagram of an example computer system that can be used to practice aspects of the present disclosure.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine mfay operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 120) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A polyalphabetic ciphering method for tokenizing data, comprising:
    receiving an input set;
    seeding a random number generator with one or more secret or non-secret data sets;
    transposing the input set using a first random number generated by the random number generator to create a transposed input set;
    extending a token set to create an extended token set, wherein when a digit of the transposed input set equals one, a token value position is determined by adding a value of a character of the transposed input set with an input size of the input;
    locating the token value by counting through the extended transposed token set using the token value position;
    substituting a position of the transposed input set with the located token value;
    transposing the extended token set using a second random number generated by the random number generator to create a transposed token set;
    generating a token by substituting transposed input set values with transposed token set values;
    hashing the transposed input set values to create a validation value, the validation value represented as a binary value set;
    encoding the validation value into the token; and
    pseudonymizing an object in a document by replacing the input set included in the document with the token.

2. The method according to claim 1, further comprising repeating part or all of the method of claim 1 a plurality of times creating additional transposed input sets and transposed token sets.

3. The method according to claim 1, wherein substituting further comprises:
    wherein when a digit of the input set equals zero, the token value position is equal to the value of the character of the transposed input set;
    locating the token value by counting through the extended transposed token set using the token value position; and
    substituting a position of the transposed input set with the located token value.

4. The method according to claim 3, wherein the extended token set has a number of token values that is at least twice a number of input characters in the input set.

5. The method according to claim 4, further comprising validating the token by recovering the validation value using the token and the transposed token set.

6. The method according to claim 1, wherein the one or more secret data comprises an identifier for an entity, the one or more secret data being indicative of the entity.

7. The method according to claim 6, wherein the one or more secret data comprises any of at least a portion of a social security number and at least a portion of a credit card number.

8. The method according to claim 1, further comprising encoding the input set prior to transposing.

9. The method according to claim 1, wherein the first and second random numbers and other subsequently generated random numbers are deterministically generated.

10. The method according to claim 1, further comprising:
receiving a detokenization request that comprises the token and the one or more secret or non-secret data sets;
calculating the first random number using the one or more secret or non-secret data sets;
regenerating the transposed token set;
recovering the transposed input set using the transposed token set and the one or more secret or non-secret data sets and the first random number; and
recovering the input using the transposed input set.

11. A polyalphabetic ciphering method for tokenizing data, comprising:
generating a hash of an input set;
seeding a random number generator with any of the hash and secret or non-secret data, wherein seeding the random number generator with one or more secret data or non-secret data and a hash of the transposed input set generates the first random number that is used to transpose the input set;
transposing the input set using a random number generated by the random number generator;
extending a token set to generate an extended token set;
transposing the extended token set using another random number to create an extended, transposed token set;
generating a token by substituting transposed input set values with transposed token set values;
repeating the prior steps a plurality of rounds to generate a final token, wherein in each round the input set is replaced with a newly generated token from a prior round;
wherein during generation of the final token, encoding a validation value into the final token that is used to validate the token during a detokenizing process;
receiving a document that includes the input set in at least one field of the document;
replacing the input set in the at least one field with the final token to pseudonymize the document;
receiving a detokenization request;
calculating the random number using the one or more secret or non-secret data sets;
regenerating the transposed token set;
recovering the transposed input set using the transposed token set and the one or more secret or non-secret data sets and the random number; and
recovering the input set using the transposed input set.

12. The method according to claim 11, further comprising encoding the final token as a readable object.

* * * * *